United States Patent Office.

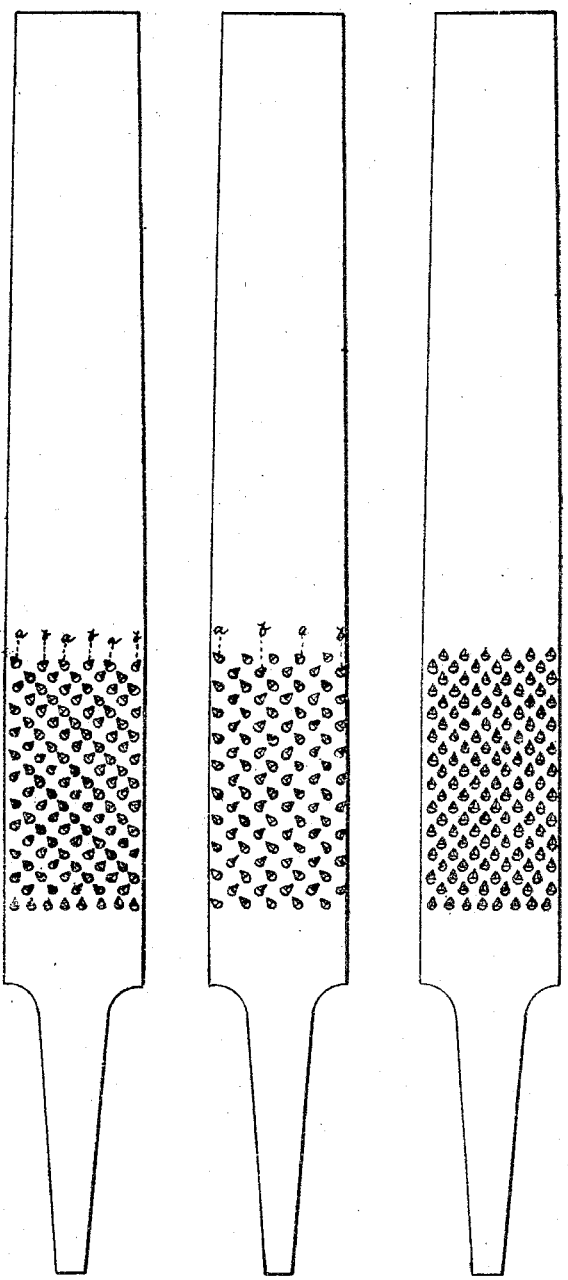

HIRAM B. NICKERSON, OF BOSTON, MASSACHUSETTS, ASSIGNOR TO HIMSELF AND STILLMAN B. ALLEN, OF SAME PLACE.

*Letters Patent No. 75,568, dated March 17, 1868.*

IMPROVED FILE.

*The Schedule referred to in these Letters Patent and making part of the same.*

TO ALL PERSONS TO WHOM THESE PRESENTS SHALL COME:

Be it known that I, HIRAM B. NICKERSON, of Boston, in the county of Suffolk, and State of Massachusetts, have made a new and useful invention, having reference to Rasps; and do hereby declare the same to be fully described in the following specification, and represented in Figures 1 and 3 of the accompanying drawings, which exhibit the arrangement of the rasp-teeth constituting my invention or improvement. Figure 2 exhibits the common arrangement of such teeth.

In the ordinary way of cutting the teeth of a rasp, the tool or cutter is held at an acute angle with the surface on which the tooth is to be raised, and it is ranged in a direction lengthwise of the rasp, so as to make the cut in that direction, in which case the cutting front face of a tooth usually stands at or very nearly at right angles with the opposite edges of the rasp-blank.

In carrying out my improvement, the teeth of each range are to be cut so that their fronts or cutting-faces shall be oblique, or at acute angles with the edges of the rasp, those of one range being made to stand obliquely in one direction, while those of the next range are made to stand obliquely in the opposite direction, as shown in fig. 1. The angles of obliquity of the cutting-faces of the teeth, I prefer to have forty-five degrees, or thereabouts, with the edges of the rasp, the same being as shown in fig. 1, in which the teeth of one range are represented at $a\,a$, and those of the next range at $b\,b$. The edges of the rasp are shown at $c\,c$.

With my improved or oblique arrangement of each tooth, it is caused, when in use, to cut with a drawing stroke, and to operate so much better than the square tooth, or that arranged as shown in fig. 2, (viz, at right angles to the edges of the rasp,) that a rasp made in my improved manner will cut through a bar of wood in about one-third the time that would be required to accomplish the same with a square-tooth rasp.

An experiment made with one of my improved rasps and another of the ordinary kind, of the size, demonstrated that it required but thirty-seven movements of my rasp to ninety-two of the common rasp, to effect like cuts through a bar of wood.

My improved rasp works much more easily than the common rasp, and in other respects to better advantage. Its teeth do not choke, but readily clear themselves of the wood or raspings.

I claim a rasp having the teeth of each range of teeth disposed obliquely to the edges of the rasp, and so that the cutting-face of each tooth shall have its obliquity arranged in a direction opposite to or about at right angles with that of each of the teeth of the next adjacent range, the whole being substantially as exhibited in fig. 1, and as hereinbefore described.

HIRAM B. NICKERSON.

Witnesses:
R. H. EDDY,
F. P. HALE, Jr.